June 24, 1969  H. R. SHEELY  3,451,899
PURIFICATION OF ACETONITRILE BY AN AZEOTROPIC DISTILLATION METHOD
Filed Dec. 21, 1965
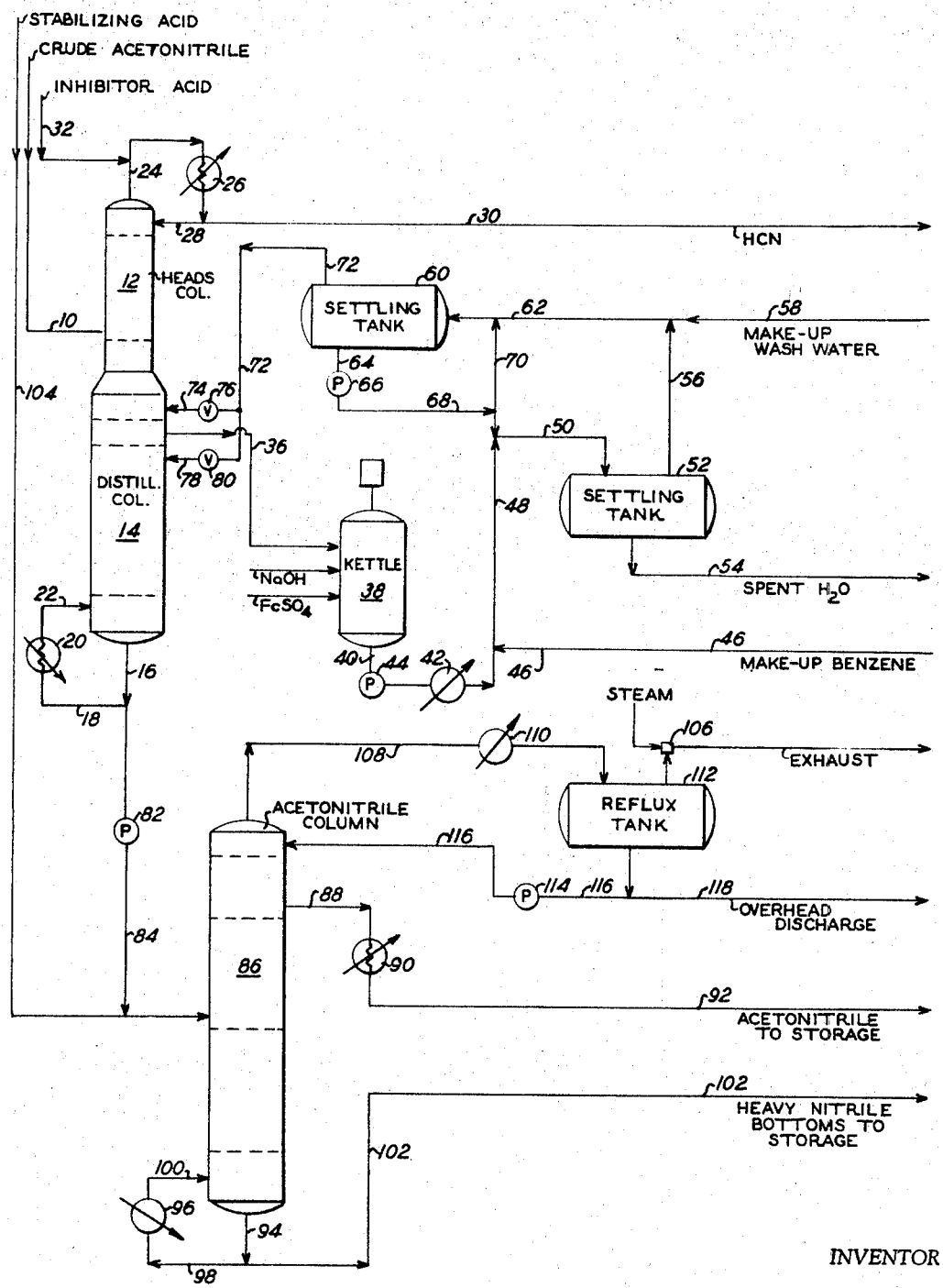
INVENTOR
HAROLD RUSSELL SHEELY
BY *Sal B. Wigg*
ATTORNEY

United States Patent Office 3,451,899
Patented June 24, 1969

3,451,899
PURIFICATION OF ACETONITRILE BY AN AZEOTROPIC DISTILLATION METHOD
Harold Russell Sheely, West Newton, Mass., assignor, by mesne assignments, to The Badger Company, Inc., Cambridge, Mass., a corporation of Delaware
Filed Dec. 21, 1965, Ser. No. 515,500
Int. Cl. C07c *121/32;* B01d *3/36*
U.S. Cl. 203—69    11 Claims

ABSTRACT OF THE DISCLOSURE

Crude aqueous acetonitrile usually obtained as by-product from acrylonitrile manufacture is purified by distillation with an entraining agent in a column still in a manner to separate most of the HCN vapors overhead, accumulating concentrated acetonitrile bottoms, and trapping all intermediate impurities at an intermediate height of the still, withdrawing the same as a side stream, purifying all azeotropic components, and returning a solution of the entraining agent and the acetonitrile in a recycle stream to an intermediate point of the column.

---

This invention relates to a method of purification of wet crude acetonitrile obtained as by-product of acrylonitrile synthesis and usually contaminated with hydrogen cyanide, acetone, water, and other higher nitriles; and particularly to a method directed to producing dry concentrated acetonitrile in a distillation with removal of impurities in a continuous side stream purification; and to intermediate purification steps performed on said side stream in continuous flow with great economy.

In prior art practices a crude acetonitrile, obtained as by-product of acrylonitrile synthesis, has numerous impurities including, in substantial quantity, free HCN, acetone, water and small quantities of other nitriles which might be present such as higher boiling nitriles, typically unstable HCN complexes like acetone cyanohydrin. Its purification is largely a batch procedure to treat the crude aqueous product in separate successive chemical treatments to remove nitriles, and particularly, nitrile decomposition products with such chemicals as ferrous salts and alkali in a series of treatments. Moreover, in normal distillation of such crude acetonitrile containing large quantities of water, a minimum boiling azeotropic mixture is formed of acetonitrile containing about 16 percent of water which is normally difficult to handle. Such crude mixture is also contaminated with acetone and with other volatile, easily decomposed cyanides, aggravating the problem of distillation to handle decomposition impurities as well as unmanageable azeotropes. The procedure of the art is quite inefficient because of the large amount of apparatus needed for batchwise handling as well as the time consumed in purification of the by-product acetonitrile to remove each impurity type. Great losses are usually involved in this old type of procedure so that better than 80 to 85% recovery of acetonitrile is not usually possible.

According to the present invention, the crude acetonitrile by-product is fed to the upper part of a distillation column together with a recycle acetonitrile purification stream containing substantial quantities of volatile aromatic hydrocarbon solvent for the acetonitrile such as benzene added to the side stream as an entraining or azeotroping and water-separating agent. The column is operated under conditions adjusted to trap the benzene and impurities of intermediate volatility in the column, removable only with a continuously withdrawn side stream.

In the lower part of the column the benzene operates to azeotropically entrain the water from the acetonitrile feed so that only a dry acetonitrile bottoms, together with some heavier nitrile components, are withdrawn as a bottoms product, easily purified to separate dry acetonitrile from heavier, and some traces of lighter nitrile decomposition products by further distillation. The upper heads portion of the column is operated under conditions to pass overhead and remove most volatile HCN, while retaining and returning the benzene, water and acetone trapped within the column and removed as an aqueous crude acetonitrile-benzene-acetone side stream which has been substantially denuded of most of the more volatile HCN. The side stream is cooled, and may be chemically treated with aqueous caustic and soluble iron salts such as ferrous sulfate to form an aqueous solution of the cyanide salts and other water soluble impurities. The aqueous treated acetonitrile mixture is further cooled and the organic and aqueous layers in the presence of the benzene are allowed to separate so that the excess water in the feed and in the chemical reagent solution are withdrawn together with water soluble impurity cyanide salts and acetone. The purified benzene-acetonitrile solution is recycled to the center of the distillation column to entrain more water. Additional minor quantities of benzene lost to the separated water phase can be added as make up, and the acetonitrile-benzene solution can be washed for ultimate removal of inorganic salt contamination, if desired, before returning the purified side stream to the column.

The benzene thus operates in the column to azeotropically form a relatively dry acetone-free acetonitrile bottoms solution which is continuously withdrawn from the bottom of the column. Relatively dry, more volatile HCN vapors pass overhead and can be condensed with refrigeration. The benzene, acetone and other volatile impurities remain trapped within the column and are continuously withdrawn with the side stream. The benzene operates as a continuously recycling, entraining and extraction solvent for separation of an organic benzene-acetonitrile solution from the aqueous salt and acetone solution. Inherent in the process is the continuous removal of acetone which is volatilized with water and benzene to remain trapped in the column, but it is dissolved in the aqueous phase formed when the side stream is cooled. The separated aqueous phase can be discarded from the system, or treated to recover dissolved acetonitrile, benzene and inorganic cyanide salts therefrom.

The concentrated dry acetonitrile and heavier nitrile bottoms, substantially freed of unstable nitriles and HCN as well as water and acetone, can be independently distilled to separate a pure acetonitrile. Heavier nitriles in such distillation can be separated as bottoms and minor quantities of decomposition products formed in this column may be recovered as overhead with acetonitrile removed as a side stream of the column. Such final distillation may be performed in the presence of stabilizers such as organic acids which enhance nitrile stability during the distillation. Moreover, the dry acetonitrile can be distilled at reduced pressure for minimizing decomposition.

Accordingly, as an outstanding characteristic of this invention, crude aqueous acetonitrile is continuously purified in a single distillation column from HCN vapors, continuously withdrawing and recycling a side stream from which many of the other impurities are removed in continuous flow treatment.

In a further outstanding characteristic of this invention, benzene is added to a continuously distilling column operated in a manner to maintain the benzene trapped therein and whose only outlet is a side stream. In the column the benzene operates as a water-entraining-azeotroping agent to volatilize water from a crude aqueous acetonitrile feed to produce relatively dry acetonitrile bottoms easily further purified by distillation. The impurities in the column are withdrawn in a side stream and cooled. The benzene causes the water and other impurities soluble therein to separate as a layer from the acetonitrile solution in benzene which is returned to the column.

A further outstanding characteristic of this invention is in treatment of a side stream with an aqueous solution of soluble iron salts and caustic to remove cyanide and acetone contaminants from the side stream as an aqueous solution thereof, which is allowed to separate by settling as an aqueous layer in the presence of the acetonitrile side stream containing substantial quantities of added benzene as a water-separating agent, so that the benzene-acetonitrile solution, purified in the separation, and by further washing, if desired, is recycled to the distillation column for further entrainment of water from the impure feed.

Other characteristics and advantages as well as objects of this invention will be inherent in the description that follows, made in conjunction with the drawing, wherein the single figure diagrammatically illustrates the operation of the process.

Crude acetonitrile is continuously fed through line 10 to a point a few plates above the lower end of a small diameter heads section 12 of a distillation column 14.

This feed may be a by-product of the production of acrylonitrile or other useful source, and comprises up to 10% of hydrogen cyanide, up to about 5% of acetone, up to about 35% of water and about 5% of other high boiling organic nitriles. Typically, as by-product of acrylonitrile production, a crude acetonitrile feedstock will contain about 3 to 7% of hydrogen cyanide, about 1 to 4% of acetone, about 15 to 25% of water and about ½ to 2% of other nitriles, the balance being substantially recoverable acetonitrile.

Heat is supplied to the bottom of distillation column 14 by a reboiler, recycling bottoms from an outlet line 16 by way of line 18 through a heat exchanger 20, returning a portion of the heated bottoms to the lower end of the column by way of line 22 at a temperature adjusted to vaporize water and added benzene as an azeotrope with the other volatile products in the column, typically, acetonitrile and acetone. The conditions of the column are maintained such that benzene introduced with a recycle side stream into the column, the most volatile component except hydrogen cyanide, is condensed at a point near the top of the heads column 12 and is continuously refluxed back into the middle of the column, thus remaining trapped in the column by being continuously reboiled and condensed by adjustment of the upper and lower temperature conditions of the column.

Hydrogen cyanide vapors pass overhead through line 24, are cooled, and are partially condensed in a refrigerated condenser 26 to a liquid, a portion being returned as reflux to the top of the column through line 28. The HCN vapor is withdrawn to storage by way of line 30. It is optional, but useful, to include small quantities of stabilizing acidic substances such as acetic, sulfuric or phosphoric acid to the HCN vapor, passed into the system through line 32 and commingling with HCN vapor in line 24, the acidic substances serving as stabilizers against decomposition of light cyanide components.

There is thus produced from the entering crude acetonitrile feed a center column product containing less than about 1% and preferably less than 100 parts per million of HCN at a point of the wide diameter of the column, several plates below the narrow heads column.

A side stream is continuously withdrawn through line 36 and optionally, but preferably, passed to a reaction kettle 38, equipped with stirring means. It is contacted with aqueous caustic and acid soluble iron salt, typically, ferrous sulfate, each dissolved in sufficient water and supplied to the kettle 38 to react with residual cyanides available from the remaining HCN or decomposed heavier organonitriles in the crude feed. The aqueous alkali and ferrous sulfate solutions added to the kettle 38 mixed with the crude acetonitrile side stream forms soluble alkali ferrous cyanides soluble in water. The reacted stream is continuously withdrawn from the bottom of kettle 38 by way of line 40 and pumped through a heat exchanger 42 by pump 44 where the stream is substantially cooled to ambient temperatures in the range of about 20 to 110° F. A stream of make-up or starting benzene for starting the system is supplied to the stream in line 48 from a source by way of line 46, sufficient to cause separation from an aqueous phase of acetonitrile and other heavier organo nitriles. The added benzene in initial supply is in large enough quantity to effect phase separation, but when the system has reached normal operating conditions, only sufficient benzene is needed to replace that which remains soluble and is withdrawn in the water phase.

The mixed organic and aqueous phases pass through lines 48 and 50 to settling tank 52. A heavier lower water phase having dissolved therein the soluble cyanide salts and acetone is withdrawn from the system through line 54. The spent water phase can be further processed to recover the salt and dissolved acetone and benzene, or discarded, as desired. The upper layer organic phase containing acetonitrile, benzene and high nitriles, is withdrawn from tank 52 through line 56, further commingled with wash water entering through line 58, both being passed to a second settling tank 60 by way of line 62. The separated wash water bottoms are withdrawn from tank 60 by way of line 64 and a portion is sent by pump 66 and line 68 as wash water recycle through line 70 for admixture with the organic phase entering acetonitrile tank 60 through line 62, and a portion of the wash water is returned to settling tank 52 by way of line 50. The washing of the organic phase and separation of the water in tank 60 is optional treatment and may be omitted, passing the organic phase from settling tank 52 directly back to the distillation column 14 as recycle by way of line 72.

The recycle line 72 may be allowed to return to the large diameter portion distillation column 14 by way of an upper return line 74 controlled by a valve 76, or by way of a lower return line 78 controlled by a valve 80. Use of the upper return line 74 immediately above the line 36 through which the side stream is withdrawn serves to immediately cool the side stream to handling of a relatively cool side stream and cooling of the column immediately below the heads section 12. This permits a reduction in the diameter of the upper heads section 12, and imposes considerably lower condensing duty on the overhead condenser 26. Since condenser 26 operates at low temperature for refrigeration of HCN vapors for condensing to liquid, this is a considerable economy.

Operating in this manner, all of the lighter impurities in the acetonitrile feed would boil above the bottoms and below the hydrogen cyanide, and become trapped in the column so as to be removable only with the side stream. Each of the chemical treatments of the side stream are performed upon a continuous flowing stream with such low residence time and consequent economy that some of these steps are indicated to be optional. For instance, the chemical treatment can be avoided since much of the residual HCN and acetone can be discarded with the spent water. Any unremoved HCN is ultimately recovered overhead of the column. The acetone also is trapped in the column and is ultimately removed only through the water phase of the side stream.

Higher boiling, substantially dry acetonitrile and heavier nitriles are continuously withdrawn as bottoms through line 16 and passed by pump 82 through line 84 to the center of an acetonitrile column 86 and are there redistilled. The acetonitrile is taken off as a side stream through line 88, cooled by condenser 90 and passed to storage by way of line 92. Heavier nitrile bottoms are withdrawn through line 94, a portion being recycled to a reboiler 96 by way of line 92 and returned for heat to the bottom of the column 98 by way of line 100. Heavier withdrawn nitriles in line 102 are cooled and sent to storage.

Some of the trace impurities such as cyanohydrin complex tend to decompose; and to inhibit this, small quantities of acidic stabilizer, such as oxalic or citric acid, may be added to the bottoms stream as it is passed to the column 84 by way of line 104. The high boiling impurities can be further stabilized in the column by operating the column under reduced pressure applied through a vacuum ejector 106. A small quantity of volatile decomposition products pass overhead of the column 86 through line 108 and are condensed to liquid by condenser 110 and a portion accumulating in reflux tank 112 is recycled by pump 114 through line 116 to the top of the column for recovery of small quantities of acetonitrile. From time to time accumulated volatiles in tank 112 or a portion thereof are discarded from the system by way of line 118.

As thus described, a continuous purification system for acetonitrile containing many impurities is provided where the acetonitrile can be recovered in high yield and economy in continuous flow of the total by-product recovery liquid. Water is economically withdrawn by use of an entraining agent such as benzene which readily vaporizes the water and which remain trapped in the column, continuously vaporizing the water to form dry bottoms on the one hand and an aqueous liquid for withdrawal as a side stream on the other. Other impurities trapped in the column are continuously withdrawn as a side stream so that any and all purification can be performed upon the continuously flowing side stream. Moreover, the benzene is never withdrawn from the system except in such small quantities as may remain dissolved in the water discarded from the system. The benzene in addition to forming a water entraining agent also effects the separation of the water soluble acetonitrile from the water and water-soluble impurities such as salts and acetone to establish independent, easily-separated aqueous and organic phases. The organic phase then is continuously returned to the column with substantial economy in recovery of as many of the by-products as desired, as well as the acetonitrile in dry state, and in improved continuous flow and good yield efficiency.

The following example illustrates the practical operation of the system:

Example I

A crude acetonitrile obtained as by-product in the production of acrylonitrile, containing approximately 6% of hydrogen cyanide, 2% of acetone, 20% of water, 0.5% acrylonitrile and about 1% of higher boiling nitriles, the remainder being acetonitrile, is continuously passed to about the middle of a small diameter heads portion of a distillation column in which it is continuously distilled. The bottoms of the column are reboiled by heat exchange with steam to provide a bottoms temperature in the column in the range of about 70 to 80° C. and to provide a top temperature of about 20 to 40° C. Hydrogen cyanide vapors pass overhead and are condensed in a refrigerated condenser, a small quantity being returned to the upper plate of the heads column as reflux. A liquid side stream containing about 100 parts per million of HCN is withdrawn from the large diameter part of the column, several plates below the heads section, and is treated with a dilute aqueous caustic solution and a dilute aqueous ferrous sulfate solution, each in concentration of about 0.25 N in quantity in slight excess to react with free HCN and nitrile decomposition products. The aqueous solution and side stream are both passed through a mixing kettle equipped with a stirrer to effect adequate mixture in passage therethrough and an outlet stream is withdrawn which has added thereto sufficient benzene to maintain the benzene content in the range of 5 to 20% based on the acetonitrile in the liquid. The solution is passed to a settling tank and the lower aqueous layer is continuously decanted. The organic layer is washed with about five volume percent of water and sent to a second settling tank, the organic layer then being returned to the large diameter portion distillation column, a few plates above the point of withdrawal of the side stream, and the decanted lower aqueous layer is returned to the first settling tank. After the system is established, only a small quantity of make-up benzene is needed to maintain the benzene content correspondingly approximate to that lost by dissolution in the aqueous phase.

The following chart illustrates the quantity relationship and distribution of the components of an operating system.

TABLE

| Stream No. | Crude aceto | HCN product | Spent water | Net side-streams | Recycle sidestream | Heads col. bottoms | Aceto products | Prod. col. reflux | Prod. col. bottoms |
|---|---|---|---|---|---|---|---|---|---|
| | 1 | 2 | 3 | 4 | 5 | 6 | 7 | 8 | 9 |
| HCN | 267 | 237 | | | | | | | |
| Aceto | 3,130 | 0.3 | 710 | 13,100 | | 2,420 | 2,370 | 5,700 | 50 |
| Acetone | 86 | | 86 | 570 | | | | | |
| Benzene | | 0.8 | 20 | 18,700 | | | | | |
| Water | 890 | 0.1 | 4,000 | 1,000 | | | | | |
| Heavies | 71 | | | | | | | | |
| Salts | | | | 875 | | 4 | | | 4 |
| | | | | | | | | | 4 |
| Total | 4,444 | 238 | 5,691 | 33,370 | 252,000 | 2,424 | 2,370 | 5,700 | 58 |

As thus described, crude acetonitrile containing substantial quantities of decomposed nitriles, free HCN, water, acetone, and heavier nitriles as typical impurities, is continuously purified by distillation in a distillation column operated with a water-separating and entraining agent such as benzene within and outside of the column. The benzene entrains water and acetone which is also volatilized to form a relatively dry acetonitrile which can be withdrawn as bottoms from the column and purification completed in a second distillation column in which relatively dry acetonitrile is readily separated by distillation. The water, acetone and benzene continuously vaporized remain trapped in the column by adjustment of the top plate temperature to maintain such impurities as liquids within the column, allowing only HCN vapors to pass overhead. The trapped impurities are withdrawn with the entraining agent and a substantial acetonitrile side stream from about the center of the column and treated continuously as a continuous flowing liquid and the acetonitrile-separating agent concentrate is recycled to the column after removal of impurities. In this manner the purification is effected in a substantially continuous flow of the impure feed. The preferred benzene entraining and separating agent performs an additional function of allowing easy separation of the water from the acetonitrile as a selective solvent for the acetonitrile whereby the water becomes expelled and separable with water soluble impurities as a lower layer by gravity. It is preferred to treat the side stream with aqueous reagents; typically, alkali and iron salts to convert the cyanides to water soluble salts remaining with the aqueous layer. Moreover, the organic layer may be further washed with water to return a recycle of relatively pure acetonitrile and benzene to the column. Other organic entraining and water separating agents may be substituted for the benzene such as monocyclic and paraffin hydrocarbons, preferably, typically, toluene, cyclohexane, methylcyclohexane, n-pentane, n-hexane and n-heptane and the like, readily volatile hydrocarbons which entrain water, are miscible with acetonitrile and which will remain trapped in the column within practical temperature ranges to separate a relatively dry acetonitrile bottoms stream. The column is operated to separate HCN vapors in the overhead.

It is possible without departing from the principle hereof, to produce a relatively dry acetonitrile and heavier nitrile mixture in the lower end of the column so that a second lower side stream in the single column comprising relatively pure dry acetonitrile can be taken off, but it is preferred to withdraw the dry crude acetonitrile heavier nitrile mixture and pass the same to a second column for independent distillation thereof. Since the heavy nitriles particularly tend to decompose with heat, it is preferred to operate the second column at lowest practical temperatures by use of a vacuum, and the distillation may be effected in the presence of stablizers such as acids to maintain the nitriles acidic, a more stable form.

I claim:

1. The method of purifying crude acetonitrile contaminated with water, hydrogen cyanide, acrylonitrile, acetone and higher boiling nitriles as major components, comprising feeding said crude acetonitrile mixture to an intermediate point of a distillation column together with a purification recycle stream containing a volatile acetonitrile soluble hydrocarbon as a water entraining and separating agent in quantity sufficient to entrain water in said feed by distillation within said column, operating said column under conditions to vaporize said entraining agent, water, acetone and impurities volatile therewith, producing a relatively dry liquid acetonitrile concentrate with higher boiling nitrile containing impurities in the lower portion of said column, maintaining conditions at the top of said column to allow hydrogen cyanide to pass overhead while condensing the entraining agent, water, acetonitrile vapors, and normally non-gaseous vaporizable impurities within the column, continuously withdrawing a side stream containing volatile acetonitrile, entraining agent, water, acetone and the normally non-gaseous impurities trapped within the intermediate portion of said column, cooling said side stream in the presence of said entraining and separating agent, separating a water phase and impurities soluble therein from a purified organic phase containing entraining agent and acetonitrile, recycling said purified organic phase to an intermediate portion of said column, and withdrawing and redistilling the dry acetonitrile bottoms solution to separate a relatively pure acetonitrile overhead stream.

2. The method as defined in claim 1 wherein the volatile acetonitrile soluble water entraining and separating agent is benzene.

3. The method as defined in claim 1 wherein the side stream is purified by treating with a dilute aqueous solution of alkali and iron salts to form water soluble alkali iron cyanide solutions of impurities therein.

4. The method as defined in claim 1 wherein sufficient make-up benzene is added as entraining agent to the side stream solution to replace benzene dissolved in water and to maintain the benzene content of the acetonitrile solution in the range of about 5 to 25%.

5. The method as defined in claim 1 wherein the organic benzene-acetonitrile solution separated from the aqueous phase is further washed with water and then recycled to said distillation column.

6. The method as defined in claim 1 wherein said side stream is treated with water soluble alkali and iron salt solutions to react with impurities in said side stream and form water soluble salts thereof and extract acetone in the aqueous phase of said mixture, and separating the water containing said water soluble impurities from the organic phase of said side stream mixture.

7. The method as defined in claim 1 wherein the purified organic phase is returned to said column at a point above that from which the side stream was withdrawn.

8. The method as defined in claim 1 wherein the recycle organic phase is returned to said column at a point below that at which the side stream was withdrawn.

9. The method as defined in claim 1 wherein the relatively dry acetonitrile bottoms solution is passed to a second distillation column and is distilled in the presence of an organic acid nitrile stabilizer to separate volatile overhead decomposed cyanic impurities from relatively pure acetonitrile withdrawn as an intermediate side stream, and from a higher boiling organic nitrile bottoms stream.

10. The method of purifying crude acetonitrile, said crude contaminated acetonitrile containing substantial quantities of hydrogen cyanide, acetone and water as major impurities together with heavier organo-nitriles as minor impurities, comprising passing said crude acetonitrile solution continuously as a feed to an intermediate point of a narrow heads section of a distillation column while maintaining the bottoms condition of said column at a temperature sufficient to vaporize water and volatile components of said mixture including extraneously added benzene as a water-entraining agent within said column, thereby continuously producing relatively dry acetonitrile and heavier organo-nitriles as bottoms while maintaining the upper heads section of said column at a temperature low enough to condense and confine all of the organic components in said column, allowing substantially only hydrogen cyanide to pass overhead of the column as vapors, whereby to produce a column composition below said feed containing less than about 1% of hydrogen cyanide, continuously withdrawing a side stream from said column at a point below said heads section, cooling said side stream and maintaining therein sufficient added benzene to separate an aqueous solution of water soluble impurities from an organic phase comprising a benzene-acetonitrile solution, and recycling the said separated benzene-acetonitrile side stream to said column, separating a bottoms stream from said column, and continuously redistilling the dry acetonitrile bottoms stream separated from said column to separate a stream of relatively pure acetonitrile.

11. The method as defined in claim 10 wherein the said side stream withdrawn from said column is treated with aqueous alkali and iron salts to form and remove water soluble salt impurities therefrom, separating the aqueous solution of impurities from the purified organic phase benzene-acetonitrile side stream solution and recycling said solution to the column at a point above the point of side stream withdrawal.

References Cited

UNITED STATES PATENTS

| 2,175,805 | 10/1939 | Jacobson | 203—14 |
| 2,305,106 | 4/1941 | Pratt | 260—465.1 |
| 3,201,451 | 8/1965 | Idol et al. | 260—465.1 |

FOREIGN PATENTS

| 540,799 | 10/1941 | Great Britain. |
| 603,823 | 6/1948 | Great Britain. |
| 603,824 | 6/1948 | Great Britain. |

CHARLES B. PARKER, *Primary Examiner.*

S. T. LAWRENCE, III, *Assistant Examiner.*

U.S. Cl. X.R.

23—151; 203—43, 68, 70; 260—465.1, 465.9, 593, 693, 701